April 24, 1962     J. THEVENAZ     3,031,531
FLEXIBLE HEAD MECHANISM GUIDED BY TAPE MOVEMENT
Filed Dec. 27, 1960     2 Sheets-Sheet 1
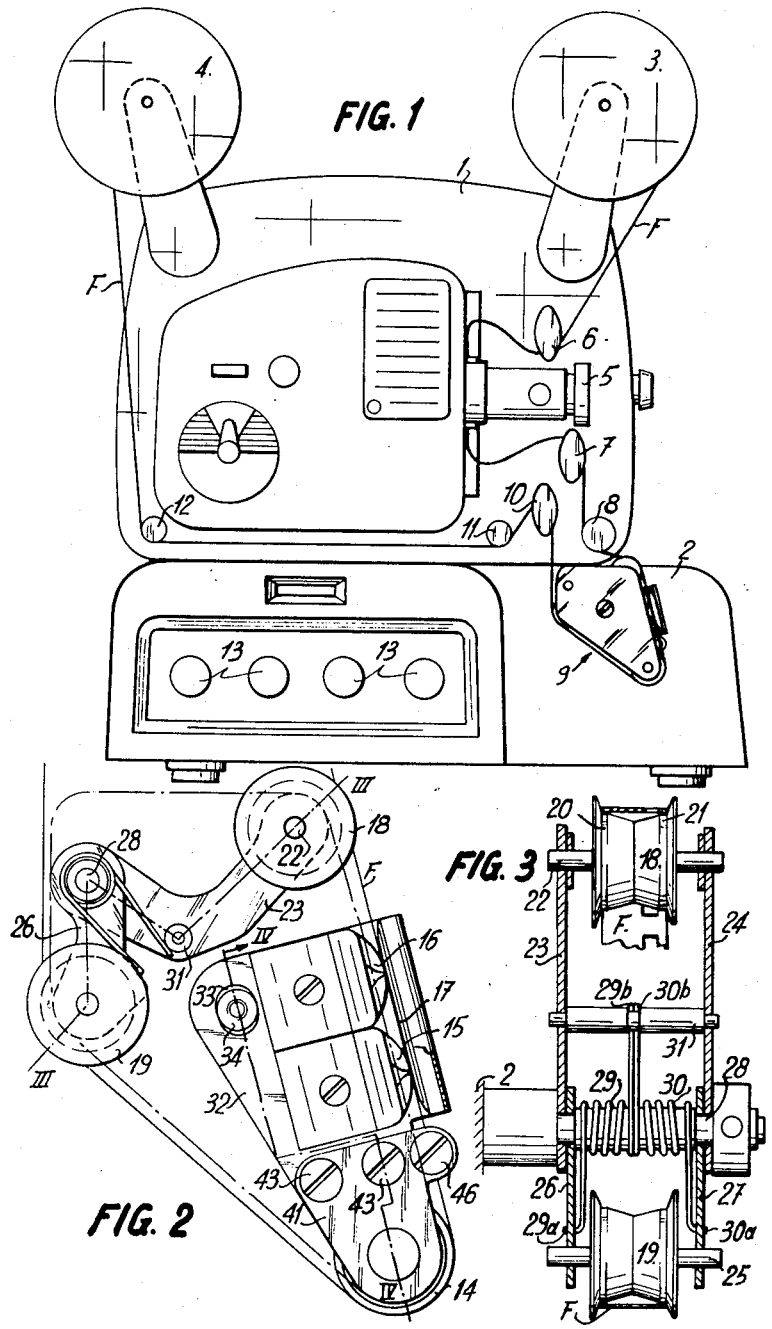

April 24, 1962   J. THEVENAZ   3,031,531
FLEXIBLE HEAD MECHANISM GUIDED BY TAPE MOVEMENT
Filed Dec. 27, 1960   2 Sheets-Sheet 2

INVENTOR
JEAN THEVENAZ

United States Patent Office 3,031,531
Patented Apr. 24, 1962

3,031,531
FLEXIBLE HEAD MECHANISM GUIDED BY TAPE MOVEMENT
Jean Thevenaz, Grandson, Vaud, Switzerland, assignor to Paillard S.A., Sainte-Croix, Switzerland, a corporation of Switzerland
Filed Dec. 27, 1960, Ser. No. 78,490
Claims priority, application Switzerland Dec. 29, 1959
6 Claims. (Cl. 179—100.2)

Reading devices are already known for use with a cinematographic film carrying a sound recording track, comprising at least one reading head adapted to explore the recording track. In these devices, the reading head is stationary relatively to a structure which is provided with means for guiding the film and causing it to pass opposite the reading head in such a manner that the recording track is in exact coincidence with the reading head.

However, the films are never absolutely rectilinear and they may be subjected to more or less large deformations, for example by reason of variations in temperature. Consequently in some cases the guiding means for the film transmits very strong forces thereto with the resulting relatively rapid wear of the film and of the guide means. Further, these forces may have repercussions on the speed of unwinding of the film and thus unfavorably influence the sound reproduction.

The present invention has for its object to remedy these disadvantages. It has for its object a reading device, characterized in that the reading head is movable in a direction parallel to the plane of the film and transversely relatively to the direction of movement thereof, this head being subjected to a resilient action, a stop member being adapted to bear against the edge of the film so as to maintain the head in the correct position relatively to the recording track.

The accompanying drawings represent, diagrammatically and by way of example, one form of construction of the device for the subject of the invention.

FIG. 1 is a side view of a projector equipped with a device for sound reproduction.

FIG. 2 is a view to a larger scale of the reading device, the protection cover being removed.

FIG. 3 is a section developed along the line III—III of FIG. 2.

Figure 4:
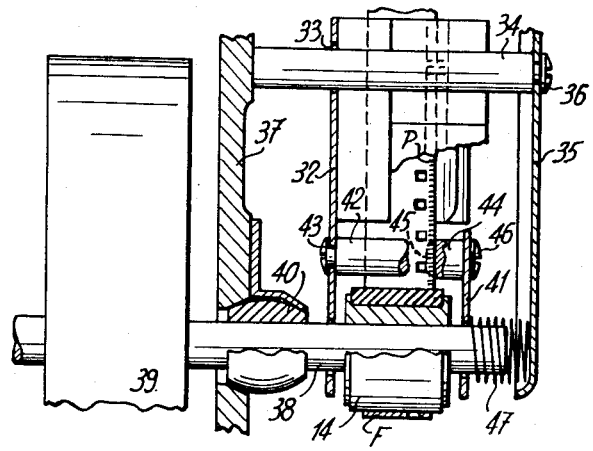
FIG. 4 is a section on the line IV—IV of FIG. 2.

FIG. 1 shows a projector 1 mounted on a base 2 carrying the elements necessary for the sound reproduction. The projector comprises, in the usual manner, a feeding spool 3 and a receiving spool 4, a luminous source, an objective 5 and a mechanism, not shown in detail, for driving the film F. The film delivered by the spool 3 passes over the sprocket wheel 6, behind the objective 5 on to a sprocket wheel 7, over a roller 8, around a reading device 9 which is shown in detail in FIGS. 2 and 3, on to a sprocket wheel 10 and over rollers 11 and 12 before being wound on the spool 4.

The reading device 9 is secured to the aforesaid base 2 by suitable framework whose components are later set forth in detail. The base or housing also contains an amplifier of which the adjusting knobs 13 are visible in FIG. 1.

The reading device comprises a roller 14, covered with rubber, for regulating the speed of advance of the film. This device also comprises a magnetic reading head 15 and an effacing head 16 in front of which passes the film F of which the sound track is pressed against these heads by a shoe 17. This device also comprises two tensioning rollers 18 and 19 subjected to a resilient action. The film F, which leaves the roller 8 of the projector, passes over the tensioning roller 18, then over the regulating roller 14, finally over the tensioning roller 19 before reaching the sprocket wheel 10 of the projector. Each roller has two circular projections 20 and 21, each adapted to support an edge of the film F. The roller 18 is secured to a spindle 22 of which the two ends are carried with clearance by two arms 23 and 24. Similarly, the roller 19 is secured to a spindle 25 carried with clearance by two arms 26 and 27. The arms 23, 24, 26 and 27 are mounted pivotally on a trunnion 28 which is secured to the base 2. This trunnion is surrounded by two helical springs 29 and 30. One end 29a, 30a respectively, of each spring, bears against each of the arms 26 and 27. The other end 29b and 30b respectively, bears against the middle of the crossbar 31 which is secured with clearance between the two arms 23 and 24 carrying the roller 18.

The spindles 22 and 25 respectively of the tensioning rollers 18 and 19 can slide axially between the arms 23, 24 and 26, 27 respectively. In this manner, these rollers can move freely along their axis of rotation and they do not play a part in guiding the film laterally. The latter can therefore follow, in the course of its displacement, the path for which the stresses to which it is subjected, are the weakest. As will be seen in FIG. 4, the roller 14, covered with rubber, is not provided with means for the lateral guiding of the film, so that said latter is guided solely by the roller 8 and the sprocket wheel 10 of the projector for the whole of the travel which it effects around the reading device.

For obtaining always a relatively exact position between the reading head and the recording track of the film, which is indicated by P in FIG. 4, the reading head is movable along a direction parallel to the plane of the film and transversely relatively to the direction of displacement of this. This head is subjected to a resilient action and a stop member is adapted to bear against the edge of the film for maintaining the head in the correct position relatively to the recording track.

With reference to FIGS. 2 to 4, the heads 15 and 16 are secured to a first wall member 32 which has a hole 33 of elongated or elliptical shape with its long axis parallel to the direction of the movement of the film for the passage of a cross-bar 34 to which a cover 35 is fixed by a screw 36. This cross-bar is itself secured to a main supporting plate 37 of the reading device 2. The wall 32 has a second hole into which passes a shaft 38 connecting the speed regulating roller 14 to an inertia flywheel 39, this shaft turning in a bearing 40 secured to the main supporting plate 37. The wall 32 is also connected to a second wall member 41 by two spacer bolts 42 secured by screws 43. This wall 41 has a hole into which passes the end of the shaft 38 and carries a stop member or guide constituted by a small block 44, having a groove 45 into which should pass the edge of the film F and secured to the wall by a screw 46. The support for the magnetic heads 15 and 16 is guided by the shaft 38 on which it can slide axially. A spring 47 exerts a pressure for maintaining the guide member in contact with the film.

During the movement of the film, the shaft 38 is driven in rotation, in such a manner that by reason of the continual sliding which is produced between this shaft and the edge of the holes of the first wall member 32 and the second wall member 41, the support of the magnetic heads is practically not subjected to any friction to move axially on the shaft 38. In this manner it is possible to provide a very weak spring, so that the lateral forces applied to the film are entirely negligible.

Figure 5:
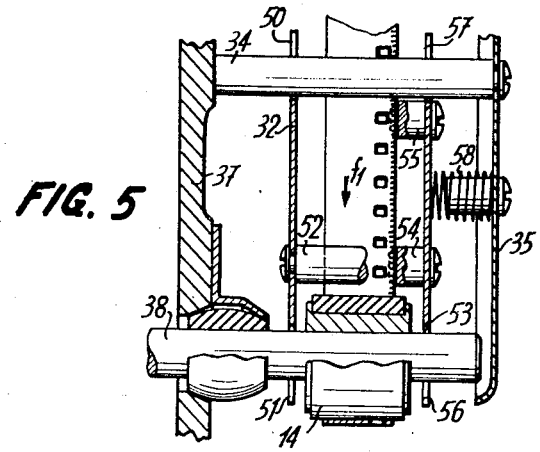
FIG. 5 is a view similar to FIG. 4 and illustrates a modified form of construction.

FIG. 5 is a view similar to FIG. 4 and represents a modification of construction, permitting of obtaining a still greater precision in the positions of the gap of the magnetic heads relatively to the sound track of the film. As previously, the magnetic heads are secured to a wall member 32 which has upper and lower notches in the form of a fork 50 and 51 adapted to guide this wall member on the cross-bar 34, on the one hand, and the shaft 38, on the other hand. This first wall member 32 is connected by a spacer bolt 52 to a second wall member 53 carrying two stop members constituted by blocks 54 and 55. This wall member 53 also has two extensions 56 and 57, in the form of a fork, ensuring its guiding between the cross-bar 34 and the shaft 38. Under the action of friction exerted by the film, which moves in the direction of the arrow $f_1$, the second wall member 53 bears, by the bottom of its notch 56, against the shaft 38. The resilient action adapted to maintain the stop members against the film is assured by a spring 58 which bears, on the one hand, against the second wall member 53 substantially half-way between the two stop blocks 54 and 55 and, on the other hand, against the cover 35.

The notches 56 and 57 are provided sufficiently wide so that a suitable clearance permits them to slide without considerable friction on the cross-bar 34. By reason of the presence of the two stop members and the resilient action applied between these members, the support of the magnetic heads can follow all the movements which the film is capable of effecting in practice. As the support has a sufficient freedom so as to be capable of oscillating about an axis perpendicular to the plane of the film, more exactly about an axis perpendicular to the plane of the drawing in FIG. 5, and passing through the point of contact between the bottom of the extension 56 and the shaft 38, the support of the magnetic heads can follow the eventual variations of the inclination of the edge of the film relatively to a plane perpendicular to the shaft 38.

It will be well understood that it is possible to provide numerous modifications of the devices described, which may, for example, comprise only a single magnetic head. It is also possible to replace the stop member 44 shown, by a loose roller rolling against the edge of the film. The magnetic head or heads may also be supported by a flexible blade permitting of their displacement parallel to the plane of the film and ensuring at the same time the elastic action necessary for maintaining the stop member against the edge of the film.

I claim:

1. A sound reproducing and amplifying device for projectors of cinematographic film carrying a sound track, comprising, in combination, a reading head adapted to explore said sound recording track, framework supporting said reading head to be movable in a direction parallel to the plane of movement of said film, means for urging the film toward the reading head, and means secured to said head, adapted to engage the edge of said film to maintain said head correctly positioned relative to the film.

2. A sound reproducing and amplifying device for projectors of cinematographic film carrying a sound track, comprising, in combination, a magnetic head adapted to explore said sound track, framework for supporting said head for movement in a direction parallel to the plane of the film, means carried by said head for engaging the edge of the film, and means cooperating with said last named means to automatically maintain said head in the correct position relative to the sound recording track.

3. A sound reproducing and amplifying device for projectors of cinematographic film carrying a sound track, comprising, in combination, a magnetic head adapted to explore said sound track, framework for supporting said head for movement in a direction parallel to the plane of the film, means on said head for engaging the edge of the film, spring means for urging said last-named means transversely to the direction of the movement of the film, a driven roller at the lower end of the framework for regulating the speed of the film, and at least one tensioning roller mounted on an axle in the upper portion of said framework and capable of moving freely along said axle to enable the film to follow, in the course of its movement, a path in which the stresses to which said film is subjected are the weakest.

4. A sound reproducing and amplifying device for projectors of cinematographic film carrying a sound track, comprising, in combination, a base, a reading head, a framework for said head and including a main plate carried by the base, spring urged film tensioning means on said plate, a film regulating roller mounted on a shaft journalled in said plate, a flywheel on said regulating roller supporting shaft, a cross-bar carried by said plate, a cover secured to said bar, a first wall member slidably mounted on said cross-bar and said shaft, said first wall member carrying said head, a spacer bolt carried by said first wall member, a second wall member carried by said spacer bolt to maintain said first and second wall members in fixed spaced relation, spring means between said cover and said second wall member for urging said member laterally of the path of movement of the film, and film edge engaging means carried by said second wall.

5. A sound reproducing device according to claim 4, wherein, the spring urged tensioning means includes two rollers carried by spindles mounted on the outer ends of related pairs of spaced arms and the inner ends of said arms are supported on a common pivot, and springs carried by said pivot urge the rollers in opposite directions.

6. A sound reproducing device for cinematographic film carrying sound recording track, comprising, in combination, a base, a framework on the base and including a main supporting plate carried by the base, a cover mounted in fixed spaced relation to said plate, film tensioning means on said main supporting plate and including a pair of spring urged tensioning rollers, a speed regulating roller mounted in the space between the cover and said plate, a driven shaft for said roller, a pair of spaced first and second wall members mounted between the cover and plate, a sound head carried by said first wall member for movement in a plane parallel to the direction of the movement of the film, resilient means carried by the said wall members and disposed in relation to the reading heads so as to provide a film guiding passage, film edge engaging means, and spring means confined between the inside face of the cover and the related second wall member to urge the film transversely relative to the tensioning rollers and the regulating roller.

No references cited.